(12) United States Patent
Firoz et al.

(10) Patent No.: US 11,495,795 B2
(45) Date of Patent: Nov. 8, 2022

(54) LTO NEGATIVE ELECTRODE MATERIAL, HAVING GRAPHENE QUANTUM DOT DOPED WITH NITROGEN ATTACHED THERETO, WITH EXCELLENT RATE CHARACTERISTICS AND NO GAS GENERATION DURING LONG TERM CHARGE AND DISCHARGE

(71) Applicant: DAEGU GYEONGBUK INSTITUTE OF SCIENCE AND TECHNOLOGY, Daegu (KR)

(72) Inventors: Khan Firoz, Daegu (KR); Jae Hyeon Kim, Daegu (KR); Mi Sol Oh, Gyeongju-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 150 days.

(21) Appl. No.: 16/954,640

(22) PCT Filed: Oct. 30, 2018

(86) PCT No.: PCT/KR2018/012975
§ 371 (c)(1),
(2) Date: Jun. 17, 2020

(87) PCT Pub. No.: WO2019/124719
PCT Pub. Date: Jun. 27, 2019

(65) Prior Publication Data
US 2020/0381717 A1     Dec. 3, 2020

(30) Foreign Application Priority Data

Dec. 18, 2017  (KR) .................. 10-2017-0174236
Dec. 18, 2017  (KR) .................. 10-2018-0061917
Dec. 18, 2017  (KR) .................. 10-2018-0077044

(51) Int. Cl.
H01M 4/485         (2010.01)
H01M 4/04          (2006.01)
(Continued)

(52) U.S. Cl.
CPC ......... H01M 4/485 (2013.01); H01M 4/0402 (2013.01); H01M 4/131 (2013.01);
(Continued)

(58) Field of Classification Search
None
See application file for complete search history.

(56) References Cited

U.S. PATENT DOCUMENTS

2017/0200940 A1    7/2017    Xu

FOREIGN PATENT DOCUMENTS

KR    10-2008-0112809    12/2008
KR    10-1042613         6/2011
(Continued)

OTHER PUBLICATIONS

Li Ruiyi et al., "Significantly enhanced electrochemical performance of lithium titanate anode for lithium ion battery by the hybrid of nitrogen and sulfur co-doped graphene quantum dots", Electrochimica Acta 178 (2015) pp. 303-311, Aug. 6, 2015.

*Primary Examiner* — Wyatt P McConnell
(74) *Attorney, Agent, or Firm* — Lex IP Meister, PLLC

(57) ABSTRACT

One example of the present invention provides a negative electrode material. Such a negative electrode material may comprise lithium titanium oxide-based particles and a graphene quantum dot coating layer doped with nitrogen that is positioned on the lithium titanium oxide-based particles.

5 Claims, 10 Drawing Sheets

(51) Int. Cl.
    *H01M 4/131*     (2010.01)
    *H01M 4/133*     (2010.01)
    *H01M 4/1391*     (2010.01)
    *H01M 4/1393*     (2010.01)
    *H01M 4/583*     (2010.01)
    *H01M 10/0525*     (2010.01)
    *H01M 4/02*     (2006.01)

(52) U.S. Cl.
    CPC ......... *H01M 4/133* (2013.01); *H01M 4/1391* (2013.01); *H01M 4/1393* (2013.01); *H01M 4/583* (2013.01); *H01M 10/0525* (2013.01); *H01M 2004/021* (2013.01); *H01M 2004/027* (2013.01)

(56) References Cited

FOREIGN PATENT DOCUMENTS

| KR | 10-1282593 | 7/2013 |
|---|---|---|
| KR | 10-1470090 | 12/2014 |
| KR | 10-2015-0098487 | 8/2015 |
| KR | 10-1605146 | 3/2016 |
| KR | 10-2016-0144831 | 12/2016 |
| KR | 10-1713259 | 3/2017 |
| WO | 2017-062521 | 4/2017 |

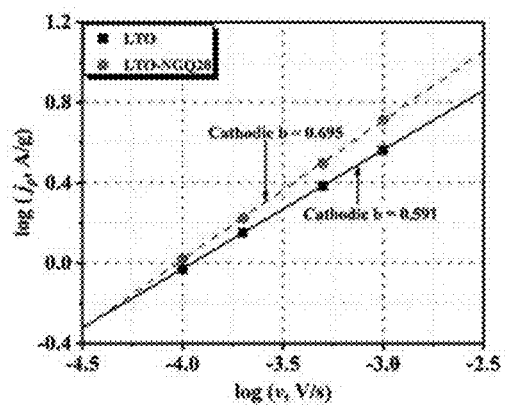
Fig. 6A
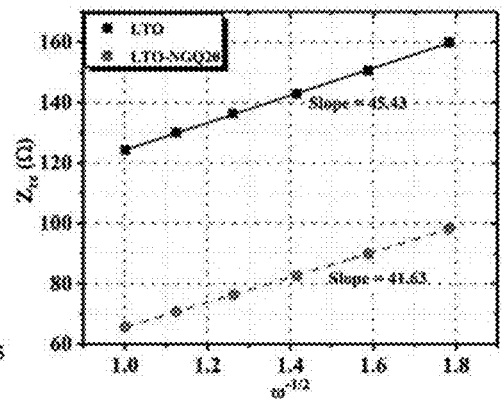
Fig. 6B
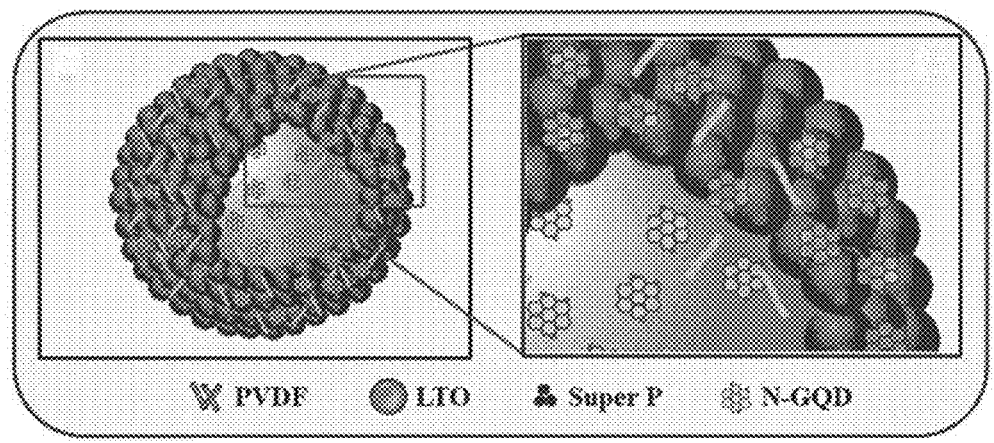
Fig. 6C                    Fig. 6D

LTO NEGATIVE ELECTRODE MATERIAL, HAVING GRAPHENE QUANTUM DOT DOPED WITH NITROGEN ATTACHED THERETO, WITH EXCELLENT RATE CHARACTERISTICS AND NO GAS GENERATION DURING LONG TERM CHARGE AND DISCHARGE

TECHNICAL FIELD

The present invention relates to a lithium titanium oxide (LTO) negative electrode material, to which nitrogen-doped graphene quantum dots are attached, with excellent rate characteristics and no gas generation during long-term charge and discharge, and more particularly, to an LTO negative electrode material which increases the high-speed charge/discharge performance of conventional LTO and solves a conventional LTO problem of gas generation from an SEI layer, and a method of preparing the same.

BACKGROUND ART

As transportation in modern civilization depends on fossil fuels, due to the limitations of fossil fuels causing global warming and air pollution and the increased condensation of greenhouse gases, today, there are two major challenges in the world.

One of the most effective solutions to reducing $CO_2$ emissions and the lack of fossil fuels is the use of an electric vehicle (EV) or hybrid electric vehicle (HEV).

Recently, research has been conducted to develop high-performance lithium-ion batteries for new applications including plug-in HEVs and EVs.

A lithium ion battery is a promising candidate with a unique energy density value, but the current lithium ion battery technology has shortcomings such as short cycle life and low power density, so it cannot efficiently store alternative energy sources or meet the requirements for the supply of power to HEVs or EVs and stability.

Therefore, there is an urgent need to develop an electrode material having a high energy density, a high output density and a long lifetime. In addition, lithium titanates ($Li_4Ti_5O_{12}$ (LTO)) have excellent high-speed capacity, excellent cycling stability and improved safety, compared to graphite, so it has attracted considerable attention as a positive electrode material for a lithium ion battery.

This electrode material may be highly improved in stability, which is caused by excellent structural stability, due to a lithium intercalation/deintercalation voltage (1.55V vs Li/Li$^+$) and a volumetric change preventing lithium growth despite and lithium intercalation/deintercalation. In addition, not only the reduction/decomposition of a metal dendrite and an electrolyte, but also a long cycle life and high rate capability are achieved.

However, the high-speed performance of the lithium titanium oxide (LTO) has problems of low intrinsic electrical conductivity ($10^{-13}$ Scm$^{-1}$) and an undistinguished lithium ion diffusion coefficient ($10^{-9}$ to $10^{-13}$ cm$^2$s$^{-1}$).

To this end, many strategies such as coating with a conductive phase such as a metallic or carbon material, shape control and microstructure design and ion doping have been suggested to dramatically improve the rate characteristics of an LTO negative electrode.

If the synthesis of high-performance LTO and an LTO material having extremely high performance and cycle stability can be obtained, problems of the conventional LTO can be solved, so the demand for LTO in the market of negative electrodes for a lithium secondary battery will significantly increase.

However, the serious gas generation behavior and related expansion problems observed in a soft pack battery during charging/discharging cycles and a storage process are great challenges for the application of an LTO-based, large-capacity lithium ion secondary battery.

Gas generation is generally caused by electrolyte decomposition due to an interfacial reaction. Surface coating using a conductive carbon layer can effectively promote electron and ion transport in LTO and greatly improve electrochemical performance, but has high reactivity to an electrolyte solution at a high temperature.

Therefore, surface modification was studied to improve the interfacial reaction of an LTO electrolyte, and a surface coating layer having low interfacial reactivity to an electrolyte solution such as ZnO, AlF$_3$, NiO$_x$, or TiN$_x$ has been suggested. However, LTO-based performance improvement was insignificant. To facilitate the widespread application of lithium ion batteries, there is still a need for developing simpler and more effective surface treatment methods.

PRIOR ART DOCUMENT

Patent Document (Patent Document 1) Korean Patent No. KR 10-1605146

Disclosure

Technical Problem

The present invention is directed to providing a nitrogen-doped graphene quantum dot-attached LTO negative electrode material, which has excellent rate characteristics and no gas generation during long-term charge/discharge. This material solves a gas generation problem in a conventional LTO preparation process, and improves high-speed charge/discharge performance.

Technical problems to be solved in the present invention are not limited to the above-described problems, and other problems which are not described herein will be fully understood by those of ordinary skill in the art to which the present invention belongs from the following descriptions.

Technical Solution

To solve the technical problems, one aspect of the present invention provides a structure which includes lithium titanium oxide-based particles; and a nitrogen-doped graphene quantum dot coating layer coated on the lithium titanium oxide-based particles, wherein the nitrogen-doped graphene quantum dot coating layer has a structure in which a plurality of nitrogen-doped graphene quantum dots are attached to each of the lithium titanium oxide-based particles.

In addition, the nitrogen-doped graphene quantum dot has a size of 1 to 6 nm.

In addition, the nitrogen-doped graphene quantum dot coating layer has a thickness of 1 to 6 nm.

In addition, the lithium titanium oxide-based particle includes $Li_4Ti_5O_{12}$, $Li_{1.33}Ti_{1.67}O_4$ or $LiTi_2O_4$.

In addition, the lithium titanium oxide-based particle has a size of less than 1 μm.

In addition, the nitrogen-doped graphene quantum dot coating layer is a coating layer of nitrogen-doped graphene quantum dots coated on a lithium titanium oxide-based particle, which is formed by preparing a mixture by adding a lithium titanium oxide-based particle powder to an aqueous solution including nitrogen-doped graphene quantum dots, and then adding an acid to the mixture and drying the resulting mixture.

Another aspect of the present invention provides a method of preparing a negative electrode material. The method of preparing a negative electrode material includes preparing an aqueous solution including nitrogen-doped graphene quantum dots, forming a mixture by adding a lithium titanium oxide powder to the aqueous solution including nitrogen-doped graphene quantum dots, and forming a structure in which the lithium titanium oxide is coated with the nitrogen-doped graphene quantum dots by adding an acid to the mixture and drying the resulting mixture.

In addition, the lithium titanium oxide includes $Li_4Ti_5O_{12}$, $Li_{1.33}Ti_{1.67}O_4$ or $LiTi_2O_4$.

In addition, the acid includes $H_3PO_4$.

In addition, the nitrogen-doped graphene quantum dot has a size of 1 to 6 nm.

In addition, the coating layer has a thickness of 1 to 6 nm.

Still another aspect of the present invention provides a lithium ion battery, which includes a negative electrode including the above-described negative electrode material.

Advantageous Effects

According to an embodiment of the present invention, lithium titanium oxide (LTO) can be protected by nitrogen (N)-doped graphene quantum dots (N-GQDs), and electrochemical properties can be improved.

In addition, a lithium ion battery using a negative electrode material according to the present invention facilitates fast charge transfer according to the improvement in physicochemical properties, and can improve the diffusion coefficient of Li ions.

In addition, the negative electrode material of the present invention can be improved in durability, and thus a gas generation phenomenon can be inhibited during a cycling process, and battery swelling caused by gas generation can be solved.

In addition, the negative electrode material of the present invention can reduce the reduction of an electrolyte.

In addition, the negative electrode material of the present invention can extend the lifetime of the lithium ion battery.

In addition, the negative electrode material of the present invention can facilitate charge transfer by providing a shorter pathway for electron transfer.

In addition, the structure of the negative electrode material can protect LTO from deterioration and corrosion caused by a reaction with an electrolyte.

In addition, the capacity of a lithium ion battery including a negative electrode material of the present invention can be improved, and maintained without disruption for 500 or more cycles.

In addition, the negative electrode material of the present invention is prepared by coating LTO with N-GQDs, and thus can prevent an SEI layer from being thickly formed.

In addition, the negative electrode material of the present invention can lead to an effect of enhancing performance as the number of cycles increases.

It should be understood that the effect of the present invention is not limited to the above-described effects, and includes all effects that can be deduced from the configuration of the present invention described in the detailed description or claims of the present invention.

DESCRIPTION OF DRAWINGS

FIG. 6 shows current density comparative graphs of LTO and LTO-NGQ and schematic diagrams of LTO-NGQ.

MODES OF THE INVENTION

Figure 1:
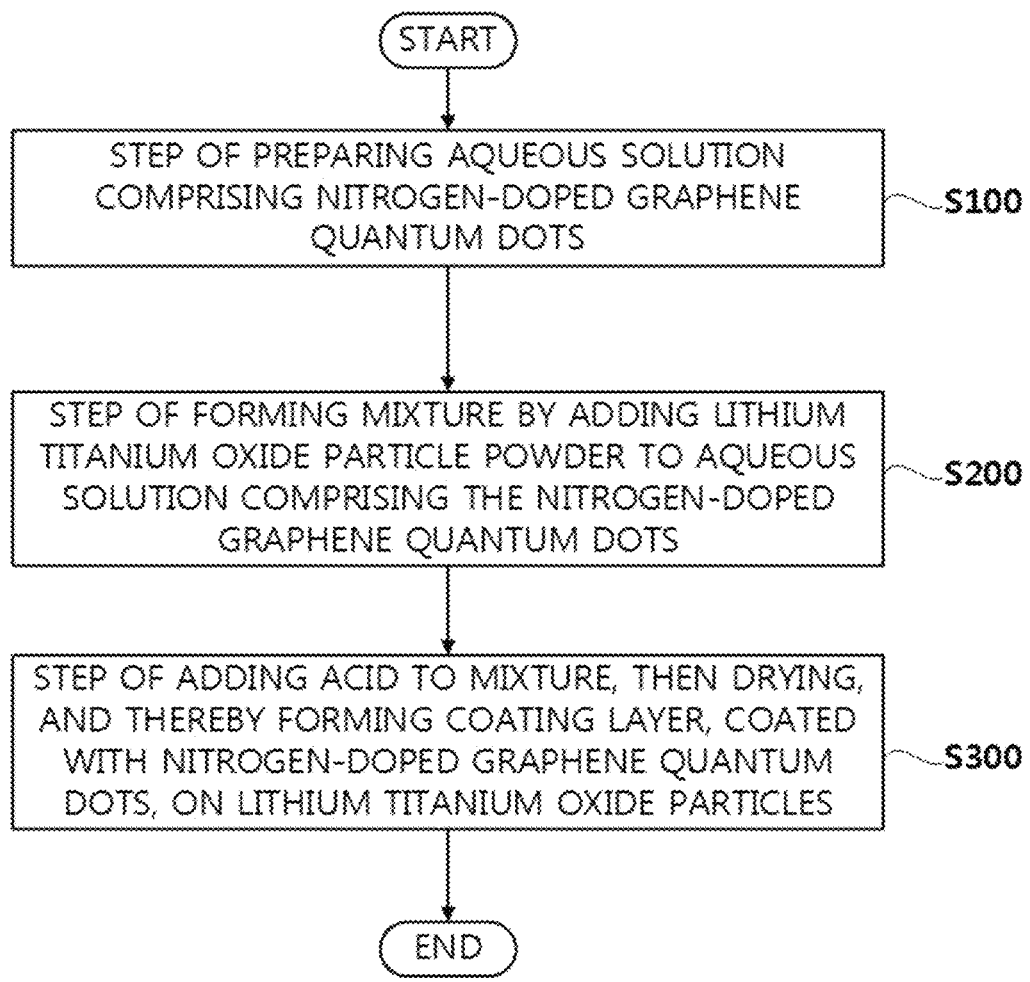
FIG. 1 is a flow chart illustrating a method of preparing a negative electrode material according to the present invention.

Hereinafter, the present invention will be described with reference to the accompanying drawings. However, the present invention may be implemented in a variety of different forms, and is not limited to the embodiments described herein. In addition, for clear explanation of the present invention in the drawings, parts that are not related to the description are omitted, and like numerals denote like parts throughout the specification.

Throughout the specification, when one part is linked to (connected with, brought into contact with or bound to) another part, this encompasses being not only "directly linked" but also "indirectly linked" by interposing a third member therebetween. In addition, when one part "includes" one component, it means that it may also include other components, not excluding components unless particularly stated otherwise.

The terms used herein are used only to explain specific examples, not to limit the present invention. Singular expressions include plural referents unless clearly indicated otherwise in the context. In the specification, the term "include" or "have" designates the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

Hereinafter, embodiments of the present invention will be described in detail with reference to the accompanying drawings.

FIG. 1 is a flow chart illustrating a method of preparing a negative electrode material according to the present invention.

Referring to FIG. 1, a method of preparing a negative electrode material according to the present invention may include preparing an aqueous solution comprising nitrogen-doped graphene quantum dots (S100), forming a mixture by adding a lithium titanium oxide particle powder to the aqueous solution comprising the nitrogen-doped graphene quantum dots (S200), and adding an acid to the mixture and then drying the resulting mixture to form a coating layer of nitrogen-doped graphene quantum dots coated on the lithium titanium oxide particle (S300).

First, an aqueous solution containing the nitrogen-doped graphene quantum dots (N-GQDs) is prepared (S100).

For example, the aqueous solution containing N-GQDs may be prepared by obtaining graphite oxide flakes purified by a Hummer's method using graphite oxide (GO), forming graphene quantum dots (GQDs) by sonication, and performing nitrogen doping in a high-pressure reaction vessel for hydrothermal synthesis.

Accordingly, since the N-GQDs are doped with nitrogen, an Li penetration effect may increase.

Thus, the N-GQDs may serve to improve conductivity of an LTO surface, and increase the diffusion coefficient of Li ions.

In addition, the aqueous solution containing N-GQDs may be formed by other known methods.

Subsequently, a mixture is formed by adding an LTO particle powder to the aqueous solution containing N-GQDs (S200).

The lithium titanium oxide may include $Li_4Ti_5O_{12}$, $Li_{1.33}Ti_{1.67}O_4$ or $LiTi_2O_4$.

In the present invention, $Li_4Ti_5O_{12}$ is used as the LTO powder, but the present invention is not limited thereto.

In addition, the lithium titanium oxide particle has a size of less than 1 μm.

It is preferable that the size of the lithium titanium oxide particle is less than 1 μm.

Subsequently, a coating layer of N-GQDs coated on the lithium titanium oxide particle is formed by adding an acid to the mixture and drying the resulting mixture (S300).

The acid may be added to adjust a pH of the mixture.

For example, the acid may include $H_3PO_4$, but the present invention is not limited thereto.

In addition, a temperature in the drying step may be 40 to 90° C.

For example, the temperature in the drying step may be 70° C., and surface-modified LTO-NGQs may be formed.

In addition, the drying method may include various methods such as a method of drying with heat in a vacuum, a thermal evaporation method, and a vacuum filtering method, but the present invention is not limited thereto.

A structure of the negative electrode material according to an embodiment of the present invention will be described.

The structure of the negative electrode material prepared by the above-described method of preparing a negative electrode material may include LTO-based particles, and N-GQDs located on the LTO-based particle.

The N-GQD coating layer has a structure in which a plurality of N-GQDs are attached to each of the LTO-based particles.

The LTO-based particle may include $Li_4Ti_5O_{12}$, $Li_{1.33}Ti_{1.67}O_4$ or $LiTi_2O_4$, but the present invention is not limited thereto.

The LTO-based particle may have a size of less than 1 μm.

The LTO-based particle preferably has a size of less than 1 μm.

In addition, the N-GQD may have a size of 1 to 6 nm.

The N-GQD may have a size of 1 to 6 nm, which is a size that can be finely cut and attached to the LTO surface.

The coating layer may have a thickness of 1 to 6 nm.

For example, as the thickness of the coating layer is 6 nm, the thickness of a solid-electrolyte interface (SEI) layer is reduced, so the maximum effects, for example, the increased conductivity of the LTO surface and the increased capacity of a battery may be exhibited.

In addition, since the N-GQD is doped with nitrogen, an effect of penetrating Li into the negative electrode material may increase.

Therefore, the N-GQDs may serve to improve the conductivity of the LTO surface, and increase the diffusion coefficient of Li ions.

In addition, the N-GQDs may serve to reduce the thickness of the SEI layer formed on the LTO.

Since lithium reactivity in the initial charging of a lithium secondary battery is very strong, an electrolyte reacts with a lithium salt on a lithium-intercalated LTO surface, thereby forming a compound such as $Li_2CO_3$, $Li_2O$, LiOH, LiF or ROCOOLi. These compounds form a passivation film on the surface, and such a film is called an SEI film.

The SEI is electrochemically formed of a solvent and an electrolyte salt, and may serve as a barrier between an electrolyte and an electrode and change a phase of a surface material.

Therefore, the properties of the SEI layer are changed according to the type of solvent included in the electrolyte solution or the characteristics of an additive, and are known as one of major factors causing a change in battery performance.

However, at a high current density, the SEI layer may be insufficient to protect an external LTO surface and may reduce high-speed charge/discharge performance.

Therefore, when the LTO surface of the present invention is coated with N-GQDs, an external surface may be protected at a high current density.

In addition, when the LTO surface is coated with the N-GQDs, the thickness of the SEI layer may be reduced, and the gas generation phenomenon occurring in cycling at a high temperature and decreasing stability may be reduced.

Therefore, as the gas generation phenomenon is reduced, the battery expansion issue may also be solved.

A lithium ion battery according to one embodiment of the present invention is described as follows.

A lithium ion battery including a negative electrode including the above-described negative electrode material may be provided.

The structure of the lithium ion battery may include an electrolyte between a positive electrode and a negative electrode, and a separator in the electrolyte, and as a negative electrode active material used for the negative electrode, the above-described negative electrode material may be included.

The negative electrode may include a plurality of the negative electrode materials, and further include a conductive material and an adhesive resin to increase the conductivity of the negative electrode material.

A lithium ion battery including the negative electrode material may have improved cycling performance, compared to when the conventional LTO is used, protect LTO, and allow rapid charge transfer by improving electrochemical and physicochemical properties. In addition, the diffusion coefficient of Li ions may be increased by 19% or more.

IN addition, the conductive material may include amorphous carbon.

For example, the adhesive resin may include polyvinylidene fluoride (PVDF).

Therefore, the conductive material may come into contact with the above-described negative electrode material (LTO-NGQ) by the adhesive resin.

In addition, the conductive material may have a higher density than LTO, and may be well dispersed on the LTO surface.

In addition, the adhesive resin may serve to well adhere the conductive material to the above-described negative electrode material (LTO-NQD).

In addition, the conductive material may bring an effect of increasing the conductivity of the negative electrode material.

Preparation of N-GQDs

1) A graphite oxide powder was dissolved in deionized water to obtain a solution having a concentration of 10 mg/ml, followed by sonication for 2 hours.

2) 5 ml of the solution was added to 40 ml of a nitric acid solution, and then refluxed at 120° C. for 24 hours.

3) A 10% sodium hydroxide aqueous solution was added to adjust a pH value to 7.

4) 0.1 ml PEI was added to the solution and then stirred at 85° C. for 1 hour using a magnetic stirrer, thereby preparing a functionalized graphite oxide solution.

5) The graphite oxide solution was subjected to hydrothermal treatment in a high-pressure reaction vessel for hydrothermal synthesis, which was full of nitrogen, at 200° C. for 12 hours, thereby obtaining an aqueous solution containing N-GQDs.

Preparation Example 1

1) $Li_2CO_3$ (2.536 g) and an anatase $TiO_2$ (6.657 g) were added to 200 ml of acetone, thereby preparing a mixed solution.

2) The mixed solution was subjected to ball milling for 24 hours.

3) The mixed solution was dried at 750° C. and then thermally treated for 1 hour, thereby obtaining a lithium titanium oxide (LTO) powder.

4) 20 ml of an N-GQD aqueous solution was put into a beaker for surface modification of the LTO powder, and the LTO powder and $H_3PO_4$ were then added to adjust a pH of the solution to 2, thereby preparing a mixture.

5) The mixture was filtered and dried at 70° C., thereby preparing the surface-modified negative electrode material, LTO-NGQ20 according to the present invention.

Preparation Example 2

1) LTO-NGQ10 was prepared in the same manner as described in Preparation Example 1, except that 10 ml of the N-GQD aqueous solution was used.

Preparation Example 3

1) LTO-NGQ30 was prepared in the same manner as described in Preparation Example 1, except that 30 ml of the N-GQD aqueous solution was used.

EXPERIMENTAL EXAMPLES

Experimental examples using Preparation Examples in which negative electrode materials according to an embodiment of the present invention were prepared will be described with reference to the drawings.

As shown in FIGS. 2 to 10 below, the LTO-NGQ10 may indicate the material prepared using 10 ml of the N-GQD aqueous solution, the LTO-NGQ20 may indicate the material prepared using 20 ml of the N-GQD aqueous solution, and the LTO-NGQ30 may indicate the material prepared using 30 ml of the N-GQD aqueous solution.

FIG. 2 shows XRD, FTIR and XPS comparative graphs of LTO and LTO-NGQ.

Figure 2A:
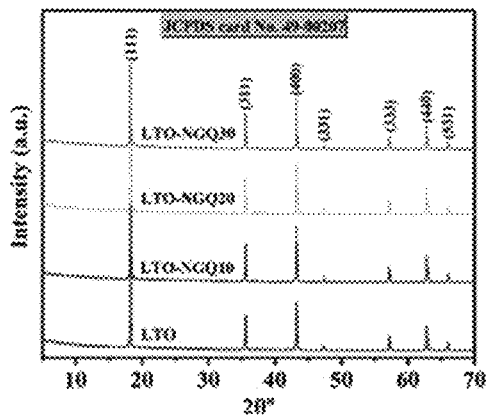
FIG. 2 shows XRD, FTIR and XPS comparative graphs of LTO and LTO-NGQ.

FIG. 2A shows XRD graphs of LTO, LTO-NGQ10, LTO-NGQ20 and LTO-NGQ30. This graph may be confirmed when analyzed by XRD.

The diffraction peaks of all samples matched well with the LTO structure, and the diffraction peaks of impurities such as $TiN_x$ or $TiO_2$ were not detected.

Figure 2B:
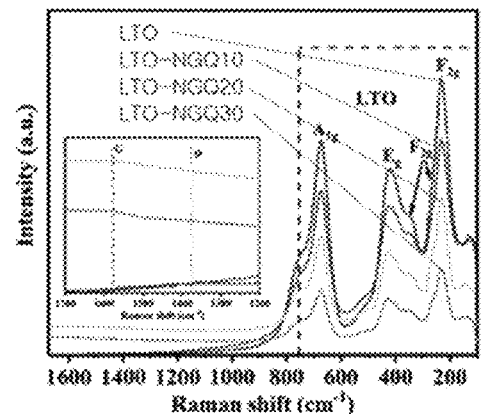

FIG. 2B shows Raman spectra of LTO and LTO-NGQ.

Referring to the Raman spectra, five Raman active vibration modes may be confirmed, and the intensity of the LTO-related Raman peak may be confirmed to be reduced according to an increased N-GQD amount, showing that the GQD layer was deposited on an LTO surface.

Figure 2C:
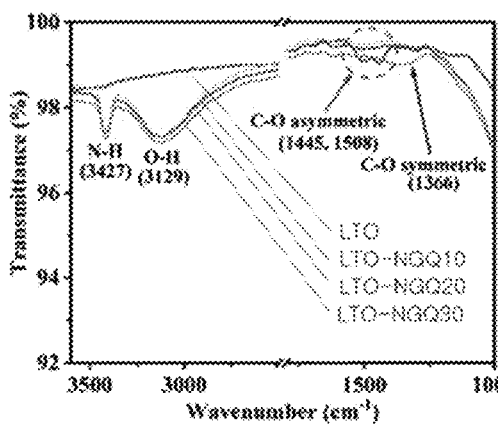

FIG. 2C is used to confirm FTIR absorption spectrum results, and LTO may have peaks corresponding to C—O at 1445 and 1508 $cm^{-1}$, which are represented by a dotted line.

It can be seen that this is caused by $Li_2CO_3$. LTO has this peak, but LTO-NGQ10, LTO-NGQ20 and LTO-NGQ30 do not.

Figure 2D:
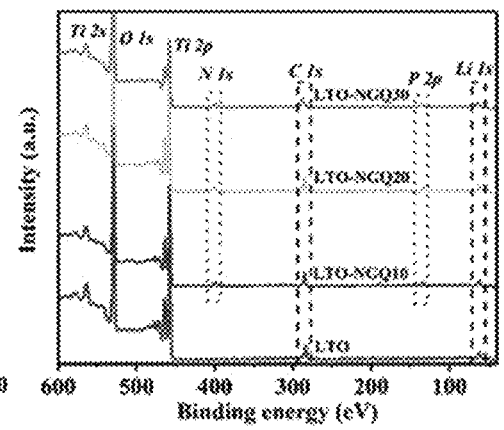

FIG. 2D shows XPS graphs of LTO, LTO-$NGQ_{10}$, LTO-$NGQ_{20}$ and LTO-NGQ30.

Figure 2E:
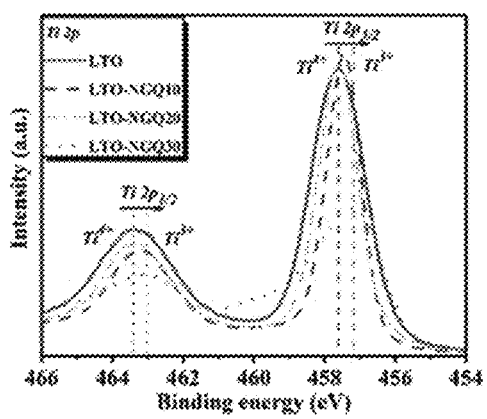

FIG. 2E shows XPS graphs of Ti 2 p of LTO, LTO-NGQ10, LTO-NGQ20 and LTO-NGQ30.

It can be seen that when LTO was coated with GQDs, the $Ti^{4+}$ peak shifts to $Ti^{3+}$, which contributes to improvement of the conductivity of LTO-NGQ.

Figure 2F:
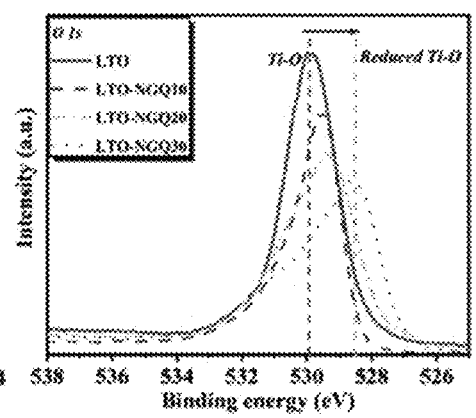

FIG. 2F shows detailed XPS graphs of LTO, LTO-NGQ10, LTO-NGQ20 and LTO-NGQ30.

Referring to FIG. 2, the compositions of LTO, and LTO-NGQ 10, LTO-NGQ20 and LTO-NGQ30 according to the present invention may be identified.

FIG. 3 shows TEM images of LTO and LTO-NGQ and a TGA graph thereof.

Figure 3A:
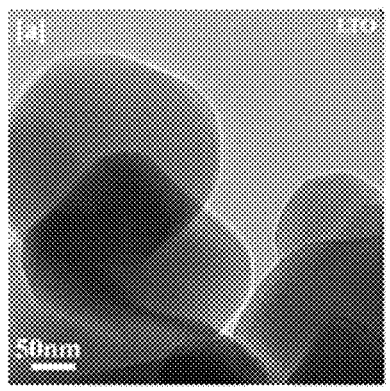
FIG. 3 shows TEM images of LTO and LTO-NGQ and a TGA graph thereof.
Figure 3B:
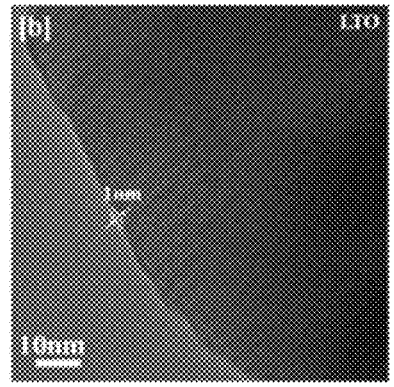
Figure 3C:
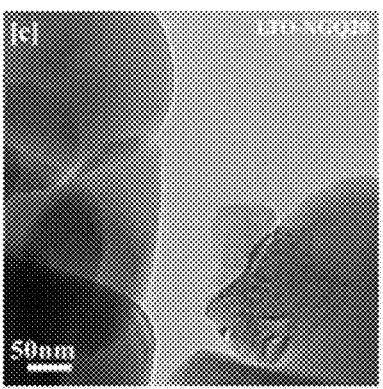
Figure 3D:
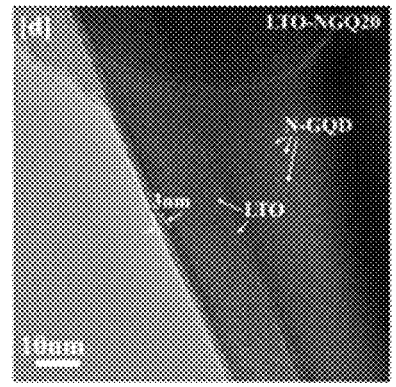

FIGS. 3A and 3B are detailed TEM images of LTO,

FIGS. 3C and 3D are TEM images of LTO-NGQ20.

Figure 3E:
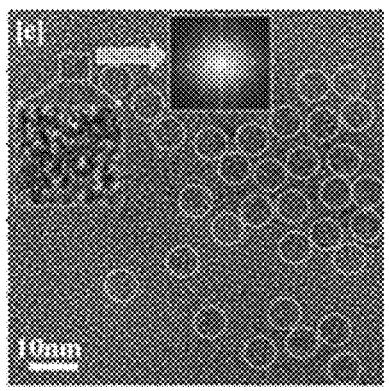
Figure 3F:
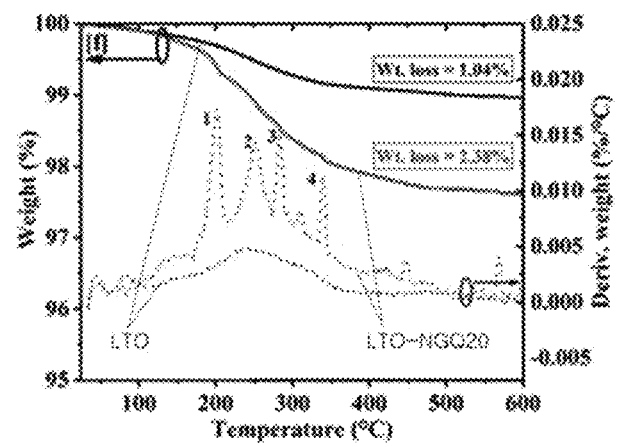
Figure 4A:
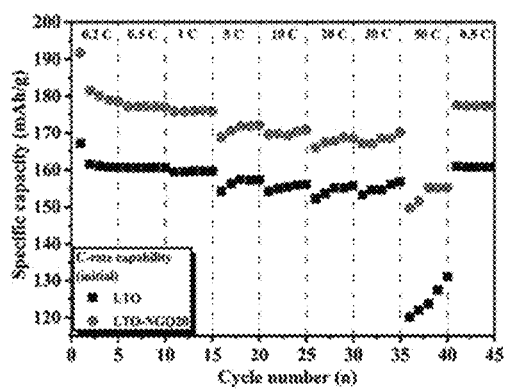
FIG. 4 shows graphs showing electrochemical performance of negative electrode materials according to the present invention.
Figure 4B:
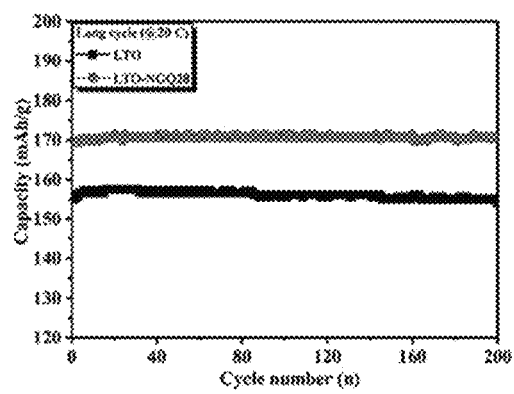
Figure 4C:
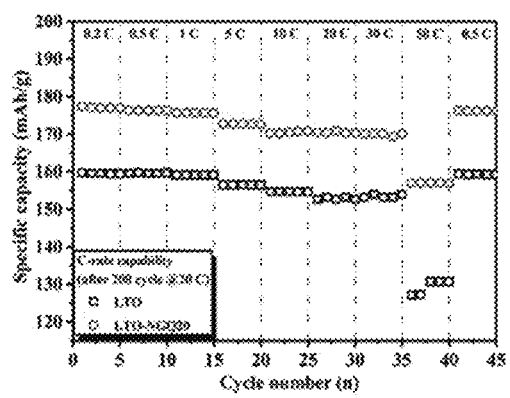
Figure 4D:
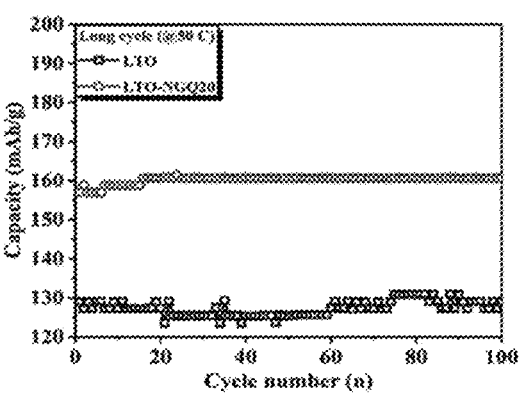

FIG. 3E is a TEM image of N-GQD, and FIG. 3F is a graph obtained by TGA to determine a GQD proportion in LTO-NGQ20. As a result, the weight ratio of GQDs was 1.35%.

Referring to FIG. 3, the structure of the LTO-NGQ20 of the present invention may be confirmed.

FIG. 4 shows graphs showing electrochemical performance of negative electrode materials according to the present invention.

FIGS. 4A to 4D are graphs comparing the cycling performance between LTO and LTO-NGQ20, and referring to this, it can be confirmed that the cycling speed and performance of the LTO-NGQ20 of the present invention are excellent.

In addition, it can be confirmed that the LTO-NGQ20 of the present invention has an effect of increasing stability as cycling continues.

FIG. 5 shows cyclic voltammograms of LTO and LTO-NGQ electrodes.

Figure 5A:
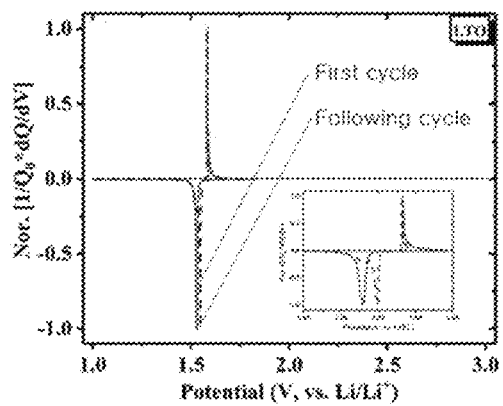
FIG. 5 shows cyclic voltammograms of LTO and LTO-NGQ electrodes.
Figure 5B:
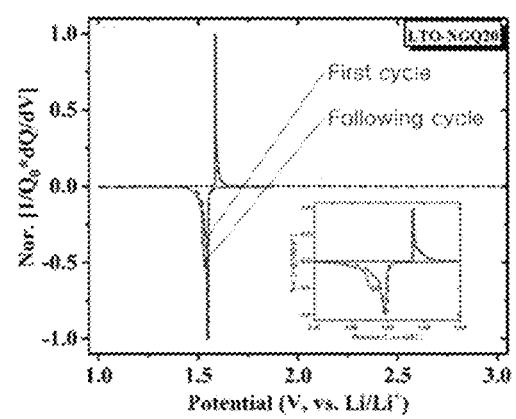

FIGS. 5A and 5B show electric potential difference vs. electric potential curves of potential-periodic cycling of LTO and LTO-NGQ20, which confirm the excellent cycle life of LTO-NGQ20 of the present invention and a very small interval between the oxidation and reduction curve peaks, and indicate that electrochemical properties are greatly improved.

Figure 5C:
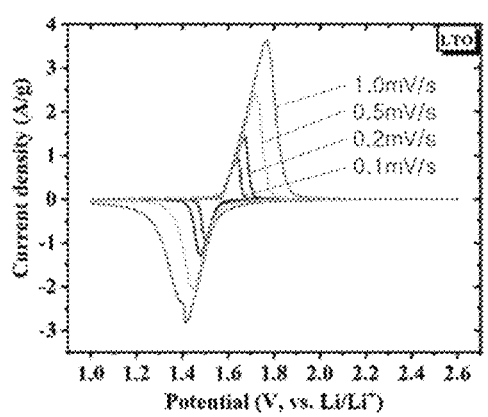
Figure 5D:
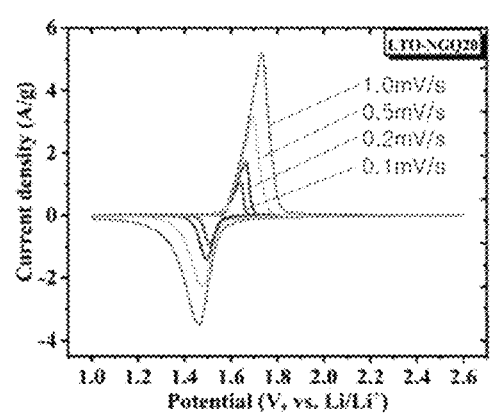
Figure 7A:
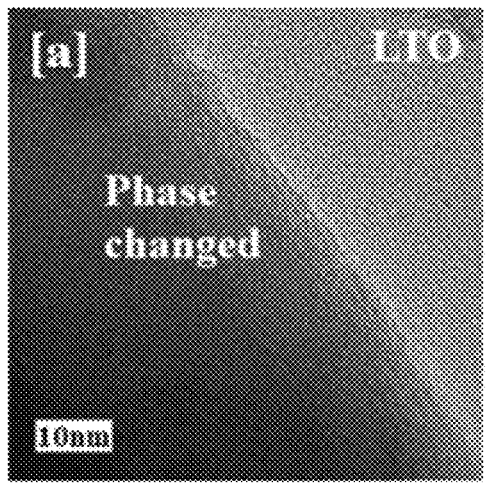
FIG. 7 shows TEM images taken after the cycling performance of LTO and LTO-NGQ.
Figure 7B:
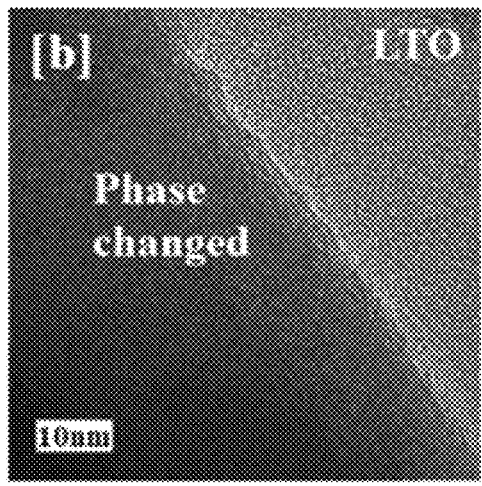
Figure 7C:
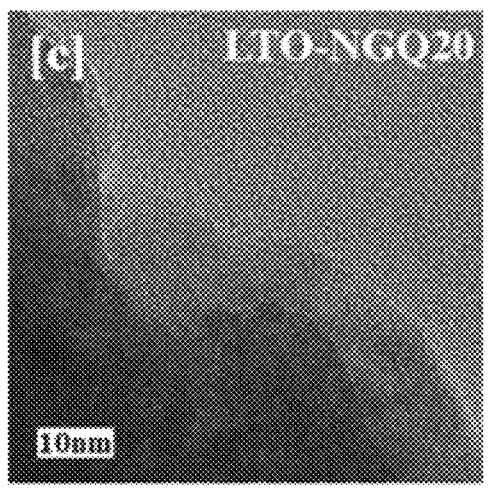
Figure 7D:
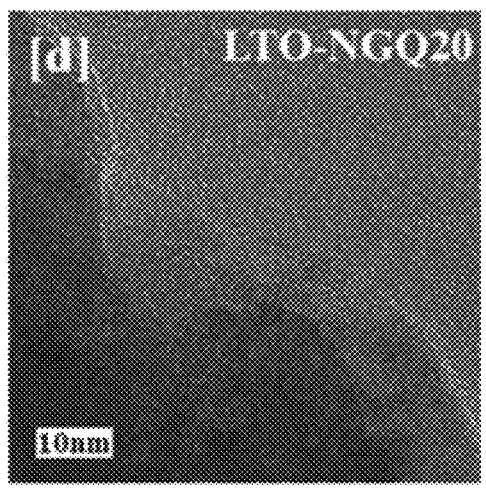
Figure 8A:
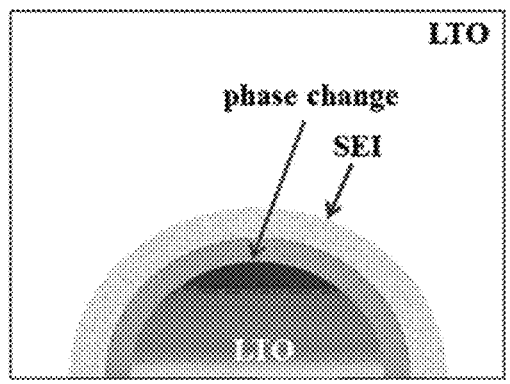
FIG. 8 shows schematic diagrams illustrating SEI formation during cycling of LTO and LTO-NGQ.
Figure 8B:
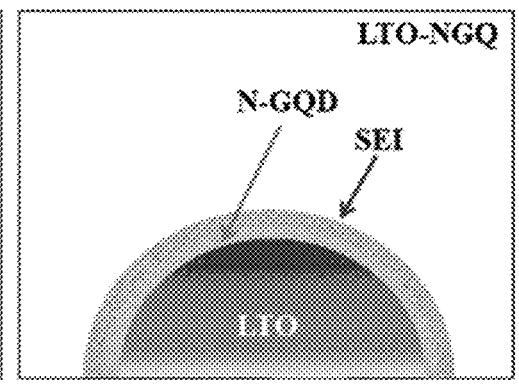
Figure 8C:
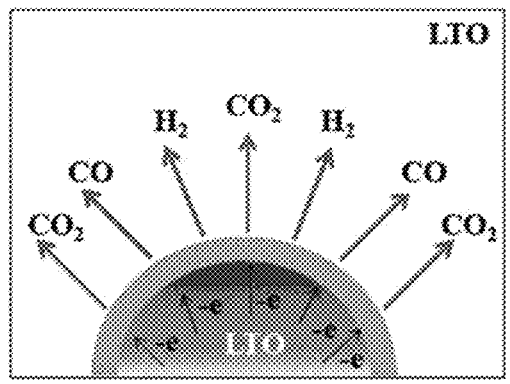
Figure 8D:
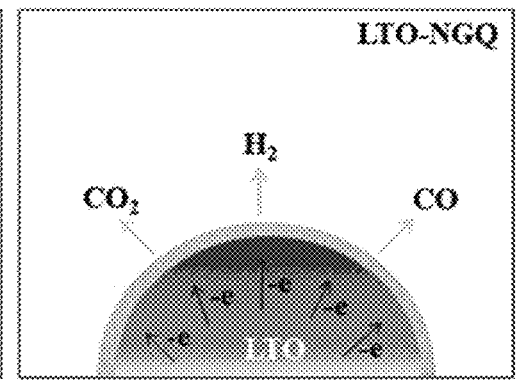

FIGS. 5C and 5D are CV comparative graphs of LTO and LTO-NGQ20.

Referring to FIG. 5, it may be confirmed that the LTO-NGQ20 of the present invention has a lower series polarization effect than LTO.

FIG. 6 shows current density comparative graphs of LTO and LTO-NGQ and schematic diagrams of LTO-NGQ.

FIGS. 6A and 6B may show Li ion diffusion coefficients of LTO and LTO-NGQ20, and show that the diffusion coefficient of the LTO-NGQ20 of the present invention increases.

FIGS. 6C and 6D are schematic diagrams of the LTO-NGQ of the present invention, and show the structure of the LTO-NGQ structure.

FIG. 7 shows TEM images taken after the cycling performance of LTO and LTO-NGQ.

Referring to FIG. 7, when LTO is compared with LTO-NGQ20, since LTO-NGQ20 is protected by N-GQDs located on the LTO surface, it may be confirmed that a thinner SEI layer is formed, compared with LTO.

FIG. 8 shows schematic diagrams illustrating SEI formation during cycling of LTO and LTO-NGQ.

Referring to FIG. 8, when LTO is compared with LTO-NGQ, it can be seen that a phase change on the LTO surface occurs by the contact between LTO and an electrolyte, thereby generating an SEI layer, and LTO-NGQ has a thinner SEI layer due to the N-GQD layer.

In addition, due to the migration of Li ions, a gas such as $CO_2$ or $H_2$ may be generated, and LTO-NGQ may reduce gas generation due to the N-GQD layer.

Therefore, as an SEI layer is formed on conventional LTO, while the SEI layer is formed by a reaction between particles and the electrolyte solution during charging and discharging, the amount of an LTO active material is reduced, and thus a gas may be generated. To solve this problem, the SEI layer is more smoothly and thinly formed by the N-GQD surface modification of the present invention and packed to prevent the diminishment of the LTO particles, so that cell swelling caused by gas generation may also be inhibited.

FIG. 9 shows XPS spectrum graphs of LTO and LTO-NGQ.

Figures 9A, 9B:
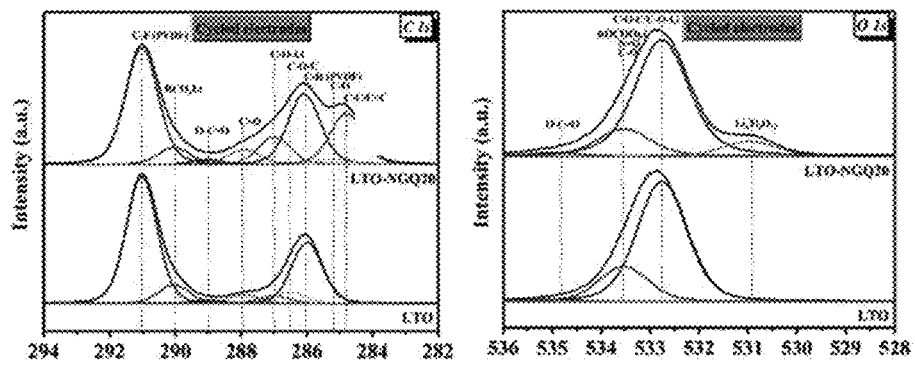
FIG. 9 shows XPS spectrum graphs of LTO and LTO-NGQ.
Figures 9C, 9D:
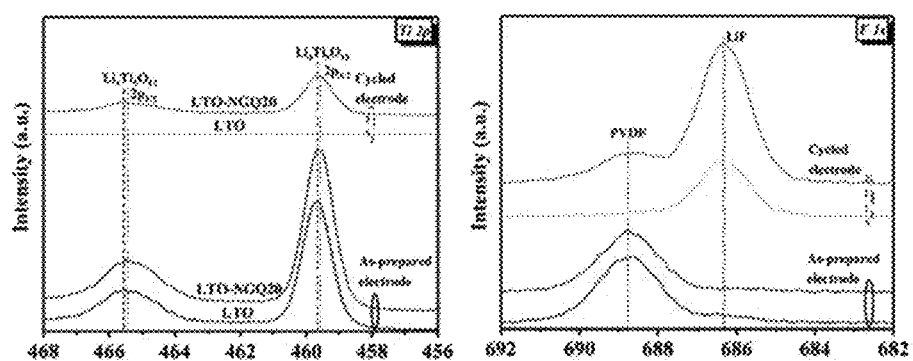
Figures 9E, 9F:
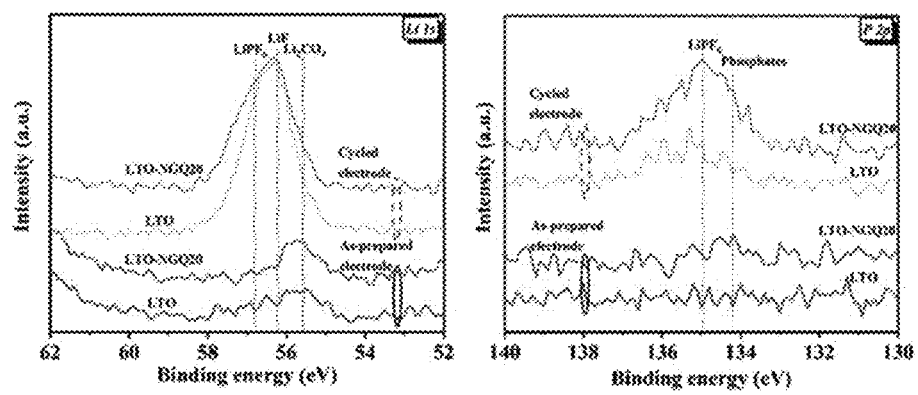

FIG. 9A is a graph of cycled C 1 s, FIG. 9B is a graph of cycled O 1 s, FIG. 9C is a graph of Ti 2 p after a cycling test, FIG. 9D is a graph of F is after a cycling test, FIG. 9E is a graph of Li 1 s after a cycling test, and FIG. 9F is a graph of P after a cycling test.

Referring to FIG. 9, high resolution XPS spectra may be identified, and comparing graphs of the LTO-NGQ20 of the present invention and the conventional LTO, since LTO has a thick SEI layer, O 1 s and Ti 2 p peaks, which are observed in pure LTO, are not observed, whereas since LTO-NGQ20 has a thin SEI layer, these peaks are observed.

Figure 10:
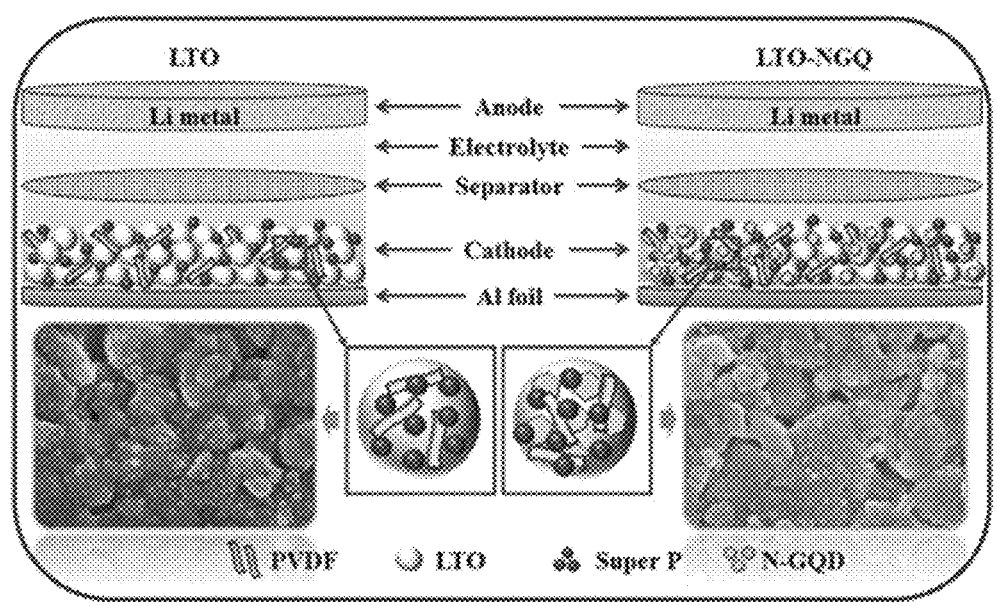
FIG. 10 is a schematic diagram of batteries including LTO and LTO-NGQ negative electrode materials, respectively.

FIG. 10 is a schematic diagram of batteries including LTO and LTO-NGQ negative electrode materials, respectively.

Referring to FIG. 10, the schematic diagram of batteries of LTO and LTO-NGQ may be confirmed. Since the N-GQD-coated negative electrode material, LTO-NGQ (N-GQDs-attached LTO negative electrode material), compared with conventional LTO, can form a uniform, thin and stable SEI layer, very excellent cycling performance may be exhibited, and a reaction between LTO and an electrolyte solution may be inhibited to prevent gas generation, and electrical charge may actively migrate on an active material surface. In addition, the diffusion coefficient of Li ions may increase by 19% or more.

According to an embodiment of the present invention, lithium titanium oxide (LTO) may be protected by N-GQDs, and electrochemical properties may be improved.

In addition, a lithium ion battery using the negative electrode material of the present invention enables fast electrical charge migration through physicochemical properties, and may improve the diffusion coefficient of Li ions.

In addition, the negative electrode material of the present invention may be improved in durability, and therefore, a gas generation phenomenon during a cycling process may be inhibited, and accordingly, the problem of battery swelling caused by gas generation may be solved.

In addition, the negative electrode material of the present invention may reduce the reduction of an electrolyte.

In addition, the negative electrode material of the present invention may extend the lifetime of a lithium ion battery.

In addition, the negative electrode material of the present invention may allow fast electrical charge migration by providing a shorter pathway for electron transfer.

In addition, the structure of the negative electrode material of the present invention may protect lithium titanium oxide (LTO) from being deteriorated and being corroded by a reaction with an electrolyte.

In addition, the capacity of the lithium ion battery including the negative electrode material of the present invention may be improved, and may be maintained without disruption for 500 or more cycles.

In addition, in the negative electrode material of the present invention, LTO is coated with nitrogen-doped graphene quantum dots (N-GQDs), thereby preventing an SEI layer from being thickly formed.

In addition, the negative electrode material of the present invention may bring an effect of further increasing performance as the number of cycles increases.

The above-described description of the present invention is merely provided to exemplify the present invention, and it will be understood by those of ordinary skill in the art to which the present invention belongs that the present invention can be implemented in modified forms without departing from the essential features of the present invention. Therefore, the exemplary embodiments described above should be interpreted as illustrative and not limited in any aspect. For example, each component described as a single unit may be implemented in a distributed manner, and components described as being distributed may also be implemented in combined form.

The scope of the present invention is represented by the following claims, and all changes or modifications derived from the meaning and scope of the claims and their equivalent concepts should be interpreted as being included in the scope of the present invention.

The invention claimed is:

1. A method of preparing a negative electrode material, comprising:
    preparing an aqueous solution comprising nitrogen-doped graphene quantum dots;
    forming a mixture by adding a lithium titanium oxide particle powder to the aqueous solution comprising the nitrogen-doped graphene quantum dots; and
    adding an acid to the mixture and then drying the resulting mixture to form a coating layer of nitrogen-doped graphene quantum dots coated on the lithium titanium oxide particle.

2. The method of claim 1, wherein the lithium titanium oxide includes $Li_4Ti_5O_{12}$, $Li_{1.33}Ti_{1.67}O_4$ or $LiTi_2O_4$.

3. The method of claim 1, wherein the acid includes $H_3PO_4$.

4. The method of claim 1, wherein the nitrogen-doped graphene quantum dot has a size of 1 to 6 nm.

5. The method of claim 1, wherein the coating layer has a thickness of 1 to 6 nm.

\* \* \* \* \*